2 Sheets—Sheet 1.

A. J. HOAG,

Assignor to NICHOLS, SHEPARD & CO.

REVERSING GEAR FOR STEAM ENGINES.

No. 9,951. Reissued Nov. 29, 1881.

Witnesses.
Franck L. Ourand,
R. W. Smith.

Inventor.
Andrew J. Hoag
by A. W. Smith
attorney

N. PETERS, Photo-Lithographer, Washington, D. C.

A. J. HOAG,

Assignor to NICHOLS, SHEPARD & Co.

REVERSING GEAR FOR STEAM ENGINES.

No. 9,951. Reissued Nov. 29, 1881.

Witnesses.
Franck L. Durand.
R. M. Smith.

Inventor.
Andrew J. Hoag
by A. M. Smith
attorney

N. PETERS, Photo-Lithographer, Washington, D. C.

UNITED STATES PATENT OFFICE.

ANDREW J. HOAG, OF BATTLE CREEK, MICHIGAN, ASSIGNOR TO NICHOLS, SHEPARD & CO., OF SAME PLACE.

REVERSING-GEAR FOR STEAM-ENGINES.

SPECIFICATION forming part of Reissued Letters Patent No. 9,951, dated November 29, 1881.

Original No. 244,807, dated July 26, 1881. Application for reissue filed November 7, 1881.

*To all whom it may concern:*

Be it known that I, ANDREW J. HOAG, of Battle Creek, county of Calhoun, State of Michigan, have invented certain new and useful Improvements in Reversing-Gears for Steam-Engines, of which the following is a full and exact description, reference being had to the accompanying drawings, making part of this specification, in which—

Figure 1:
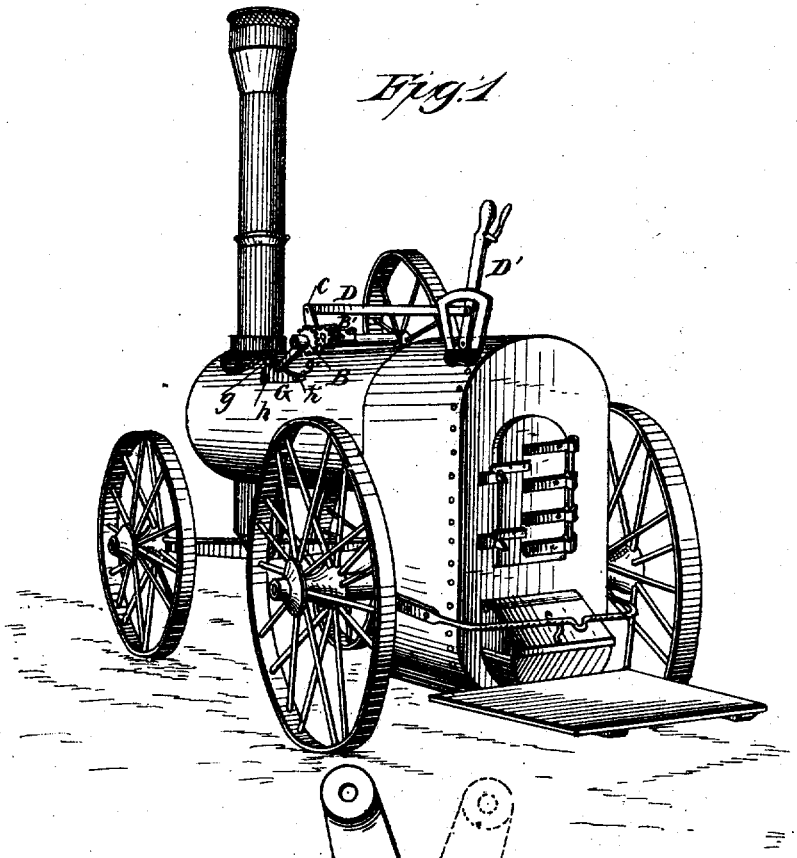
Figure 2:
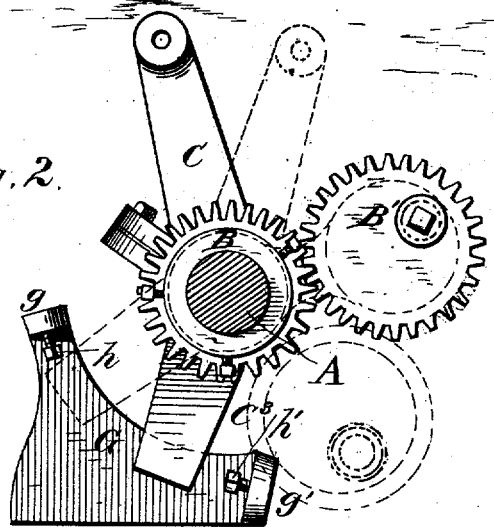
Figure 3:
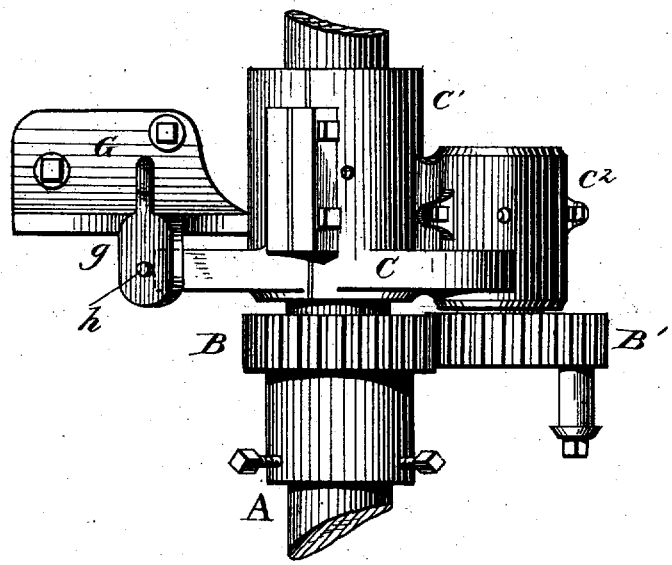
Figure 4:
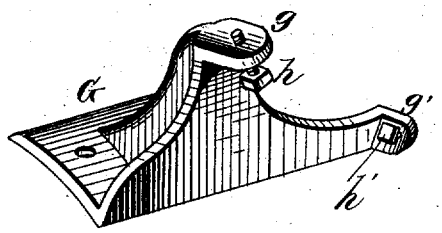

Figure 1 is a perspective view of so much of a traction-engine as is necessary to show my improvement applied. Fig. 2 is a side elevation, showing the main engine-shaft in section with the reversing-gear and lever in working relation to the adjustable stops. Fig. 3 is a plan or top view of the same; and Fig. 4 is a perspective view of the stop-plate detached.

My invention relates to a novel arrangement of reversing-gear and its actuating-lever in connection with stops for regulating with precision the throw of the reversing-lever and the amount of lead, as hereinafter explained.

The engine, in its organization and arrangement of parts, may be similar to those now in use, and it need not, therefore, be described in detail further than is necessary to an understanding of my improvements.

The reversing-gear shown is of the kind employing two gears of equal diameter, one mounted upon the main engine-shaft and rotating therewith, and the other gearing therewith upon a short parallel shaft upon an arm of a lever adjustable upon the main engine-shaft as a center, the last-named gear carrying the crank-pin to which the valve-rod is connected. My improvement will be best understood from the following description, with reference to the drawings, in which—

A represents the main engine-shaft, and B a spur-gear mounted thereon, and keyed or otherwise secured to said shaft so as to rotate with it.

C is a lever-plate journaled upon the shaft A by means of a sleeve, C′, surrounding said shaft, and provided with an arm, $C^2$, the outer end of which has a suitable bearing for a short shaft carrying a second spur-gear, B′, or upon which said gear is mounted. The gear B′ is of the same diameter as gear B, and engaging with and being actuated by said gear is consequently rotated in the same time, at the same rate of speed, as gear B, but in a reverse direction. The lever-plate has a rod, D, connected with it, which extends rearward to and is connected with a lever, D′, arranged within convenient reach of the attendant, said lever engaging, by means of a thumb-latch, with a rack-segment for holding it at any desired adjustment. The elasticity of this rod D has been found to render it unreliable in determining the adjustment of the gear B′ relative to the gear B and the amount of lead given with the precision required, and to obviate this difficulty I provide the lever-plate C with a third arm, $C^3$, moving between stops on a plate or bracket, G, secured to the boiler or other suitable point of support underneath the shaft A, as shown. This plate or bracket is curved on its upper face, or has arms projecting upward from it, provided at their upper or outer ends with laterally-projecting spurs or ears *g g′*, in which the stops are secured, said stops consisting, in the present instance, of headed-screws *h h′*, by the adjustment of which the throw of the arm $C^3$, and of the lever-plate C, of which it forms a part, is determined with entire precision, and is not left dependent upon the degree of rigidity of the connecting-rod referred to.

By the adjustment of the stops *h h′* the throw of the lever-plate, and of the valve-rod crank-wrist connected therewith, may be varied for regulating or adjusting the lead as desired.

The operation of the gear in reversing the engine is well understood, and need not here be described.

Having now described my invention, I claim—

1. The combination, with the valve-rod and the lever carrying the crank-wrist, of the rod and lever for actuating said lever, and the arm and adjustable stops for regulating its throw, substantially as and for the purpose described.

2. In a reversing-gear for steam-engines, the two gears, of equal diameters, mounted one on the main engine-shaft and the other upon a lever, adjustable around said shaft as a center, and carrying the crank-wrist, to which the valve-rod is connected, in combination with stops limiting the throw of said lever.

3. In combination with the lever, the gear-wheels, and the valve-rod, the segmental guide and adjustable stops, substantially as and for the purposes specified.

ANDREW J. HOAG.

Witnesses:
ALFRED A. ELLSWORTH,
FRANK W. DUNNING.